April 27, 1943.   F. L. KALLAL   2,317,916
RAKE
Filed Feb. 25, 1942
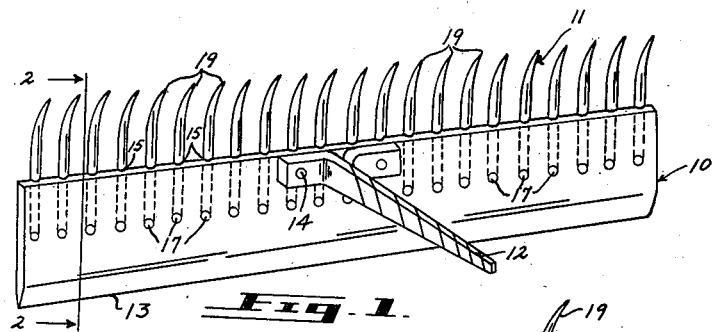
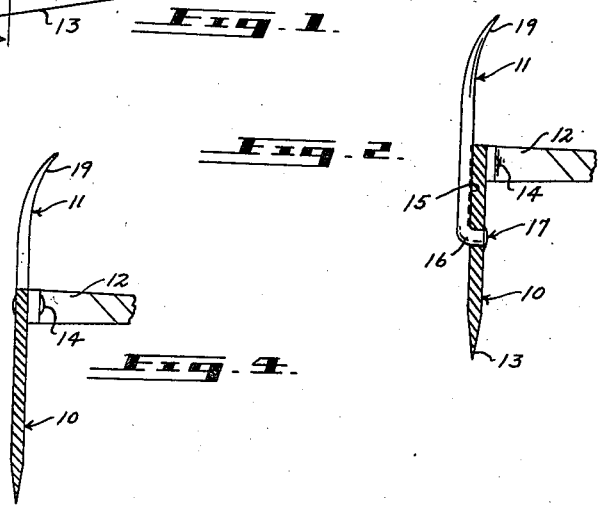
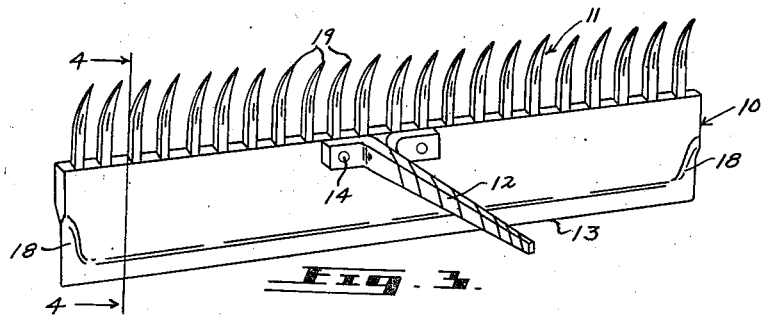
INVENTOR
Frances L. Kallal
Ralph Burch
Attorne Patented Apr. 27, 1943

2,317,916

UNITED STATES PATENT OFFICE 2,317,916

RAKE

Frances L. Kallal, Tofield, Alberta, Canada

Application February 25, 1942, Serial No. 432,329

1 Claim. (Cl. 56—400.1)

This invention relates to garden tools and more particularly to a combined rake and hoe.

The invention has for its primary object the provision of a tool of the type described which is durable and efficient in operation and which is comparatively inexpensive. In performing the functions of both a rake and a hoe, at a cost comparable to either one of the tools the device is held to be a distinct improvement in the art.

Another object of the invention is to provide a tool which will greatly assist an operator. The operation of hoeing the ground and raking the ground may be accomplished without the need of obtaining different tools which is oftentimes annoying and wasteful. With the adoption of my invention an operator may quickly change from one operation to the other by twisting the tool handle around in his hands.

With the above noted and other objects in view which may appear as the description proceeds the invention resides in the novel construction, combination and arrangement of co-operating parts as hereinafter more specifically set forth, claimed and shown in the accompanying drawing forming part of this application and in which:

Fig. 1 is a perspective view of one embodiment of my invention.

Fig. 2 is a sectional view on the line 2—2 of Figure 1.

Fig. 3 is a perspective view of another embodiment of my invention, and

Fig. 4 is a sectional view on the line 4—4 of Figure 3.

Referring more in detail to the drawing in which similar reference characters designate corresponding parts throughout the several views it will be seen that the invention consists of a hoe portion 10 and a rake portion 11 and a tong 12. In the embodiment illustrated in Figures 1 and 2, the hoe portion 10 has a sharpened edge 13 for mulching the ground. The tong 12 is bolted, riveted or otherwise secured to the top part of the hole blade as indicated at 14. The teeth 11 are received in grooves 15 and are bent at 16 to project through apertures in the hoe blade where they are riveted 17.

In the embodiment of my invention illustrated in Figures 3 and 4, the hoe blade and teeth are formed integral and consists of a metal stamping having a sharpened edge 13 and sharpened ends 18. As clearly indicated in the drawing the teeth 11 are formed by stamping out the predetermined area between the said teeth. The tong 12 is secured to the hoe blade in the manner hereinbefore described.

In each embodiment of the invention I have sharpened the tips 19 of the teeth and bent them forward slightly to increase the efficiency thereof.

From the foregoing it will be seen that I have produced a combination rake and hoe which may be assembled as in Figure 1, wherein the teeth are prevented from inadvertent displacement or which may be formed integral as indicated in Figure 3. In each embodiment of the invention the principle and function are the same.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the construction, combination and arrangement of cooperating parts may be resorted to within the scope of what is claimed without departing from the spirit of the invention.

I claim:

A garden tool comprising an elongated rectangular flat metal plate having a row of spaced apertures along its longitudinal median line, grooves in one face of said plate extending from said apertures to one edge of said plate, a tang attached to the other face of said plate intermediate its length and along one edge thereof, and a series of prongs seated in said grooves with one end bent to extend through said apertures and riveted therein, the opposite ends of said prongs extending beyond the edge of said plate to form teeth.

FRANCES L. KALLAL.